(12) United States Patent
Rudningen

(10) Patent No.: US 6,289,549 B1
(45) Date of Patent: Sep. 18, 2001

(54) MIRROR WIPER WITH WASHER

(76) Inventor: Arnold Rudningen, 4878 -- 255th St. E., Faribault, MN (US) 55021

( * ) Notice: Subject to any disclaimer, the term of this patent is extended or adjusted under 35 U.S.C. 154(b) by 0 days.

(21) Appl. No.: 09/329,819

(22) Filed: Jun. 10, 1999

(51) Int. Cl.[7] ................ B60S 1/46; B60S 1/56; B60S 1/52
(52) U.S. Cl. ............... 15/250.003; 15/250.01; 15/250.32; 239/284.1; 359/507; 359/874
(58) Field of Search ............. 15/250.003, 250.002, 15/250.23, 250.01, 250.16, 250.32, 250.351; 239/284.1, 284.2; 359/507, 874

(56) References Cited

U.S. PATENT DOCUMENTS

| | | | |
|---|---|---|---|
| 2,676,821 | * | 4/1954 | Reichelderfer .................. 15/250.32 |
| 2,913,754 | * | 11/1959 | Zee ................................ 15/250.003 |
| 3,940,822 | * | 3/1976 | Emerick et al. ................ 15/250.003 |
| 4,088,358 | * | 5/1978 | Hirsch ............................ 15/250.002 |
| 4,611,761 | * | 9/1986 | Pollard .......................... 239/284.1 |
| 4,763,381 | * | 8/1988 | Williams ........................ 15/250.003 |
| 5,062,176 | * | 11/1991 | Unterborn et al. ............. 15/250.23 |

FOREIGN PATENT DOCUMENTS

| | | | |
|---|---|---|---|
| 2617781 | * | 1/1989 | (FR) .............................. 15/250.003 |
| 2025867 | * | 1/1980 | (GB) ............................. 15/250.003 |
| 209448 | * | 12/1982 | (JP) .............................. 15/250.003 |

* cited by examiner

Primary Examiner—Gary K. Graham
(74) Attorney, Agent, or Firm—Michael S. Neustel

(57) ABSTRACT

A mirror wiper with washer for cleaning debris from a vehicle's side mirrors thereby maintaining an unobstructed view for the driver. The inventive device includes a motor attached to the rear of a mirror frame with the drive shaft extending through an aperture within the mirror glass, a wiper blade attached to the end of the drive shaft, a pump fluidly connected to a washer reservoir on the vehicle, a dispensing nozzle adjustably positioned upon the mirror frame and fluidly connected to the pump, a control unit electrically in communication with the pump and motor for allowing the user to manually control the operation while within the vehicle. The wiper blade includes a slip clutch which allows blade to be vertically aligned on each side of the mirror glass by engaging the opposing stopper members. The control unit preferably includes a pair of power switches and a pair of fluid switches for independently controlling the left and right sides of the mirrors. The dispensing nozzle is adjustably retained to the mirror frame by a clip member that allows repositioning of the dispensing nozzle depending upon the weather conditions to ensure adequate dispensing of the washer fluid.

12 Claims, 4 Drawing Sheets

MIRROR WIPER WITH WASHER

BACKGROUND OF THE INVENTION

1. Field of the Invention

The present invention relates generally to side mirrors for vehicles and more specifically it relates to a mirror wiper with washer for cleaning debris from a vehicle's side mirrors thereby maintaining an unobstructed view for the driver.

Side mounted rear view mirrors on a vehicle, and especially on transport trucks, are exposed to rain, snow, dew, dirt and road salt. These mirrors are often smeared and dirty, partially blocking the driver's view of the traffic beside and behind their vehicle. It is not very practical for a truck driver to stop and wipe the side mirrors every time their view becomes partially obstructed even though it increasingly becomes unsafe for the driver and other drivers. Hence, there is a need for a wiper device that is mounted upon the side mirrors and operable from within the cab of the vehicle.

2. Description of the Prior Art

Examples of attempted wipers for side mirrors include U.S. Pat. No. 4,212,091 to Jones; U.S. Pat. No. 5,634,234 to Allain; U.S. Pat. No. 4,369,542 to Tamura et al; U.S. Pat. No. 3,968,537 to Wagenhofer; U.S. Pat. No. 4,672,708 to Williams; U.S. Pat. No. 4,763,381 to Williams; U.S. Pat. No. 4,466,712 to Vitaloni; U.S. Pat. No. 3,886,258 to DeGraw which are all illustrative of such prior art.

Jones (U.S. Pat. No. 4,212,091) discloses a wiper apparatus for viewing surface. Jones teaches a mounting frame supporting a viewing device and a wiper frame slidingly disposed for bi-directional linear motion relative to the viewing surface.

Allain (U.S. Pat. No. 5,634,234) discloses a wiper accessory for a side mounted rear view mirror of a vehicle. Allain teaches a wiper blade, a drive module having a rotary drive, a flexible arm for moving the blade across the surface of the rear view mirror, and an auxiliary mirror mounted on the drive module.

Tamura et al (U.S. Pat. No. 4,369,542) discloses a mirror apparatus having wiper means. Tamura teaches a blade member, a pair of holders supporting the blade member, and a pair of stays for supporting the pair of holders.

Wagenhofer (U.S. Pat. No. 3,968,537) discloses a wiping blade device for truck rear view mirrors. Wagenhofer teaches a motorized wiping device for cleaning rear and side view mirrors of trucks, buses, trailers and other heavy vehicles.

While these devices may be suitable for the particular purpose to which they address, they are not as suitable for cleaning debris from a vehicle's side mirrors thereby maintaining an unobstructed view for the driver. The prior art devices require many moving components for the wiper arm assembly that are prone to breakage and significantly obstruct the view of the driver. In addition, many prior art devices do not have their own fluid dispensing systems making the wiper blades virtually worthless because of the smearing.

In these respects, the mirror wiper with washer according to the present invention substantially departs from the conventional concepts and designs of the prior art, and in so doing provides an apparatus primarily developed for the purpose of cleaning debris from a vehicle's side mirrors thereby maintaining an unobstructed view for the driver.

SUMMARY OF THE INVENTION

In view of the foregoing disadvantages inherent in the known types of mirror wiper devices now present in the prior art, the present invention provides a new mirror wiper with washer construction wherein the same can be utilized for cleaning debris from a vehicle's side mirrors thereby maintaining an unobstructed view for the driver.

The general purpose of the present invention, which will be described subsequently in greater detail, is to provide a new mirror wiper with washer that has many of the advantages of the mirror wiper devices mentioned heretofore and many novel features that result in a new mirror wiper with washer which is not anticipated, rendered obvious, suggested, or even implied by any of the prior art mirror wiper devices, either alone or in any combination thereof.

To attain this, the present invention generally comprises a motor attached to the rear of a mirror frame with the drive shaft extending through an aperture within the mirror glass, a wiper blade attached to the end of the drive shaft, a pump fluidly connected to a washer reservoir on the vehicle, a dispensing nozzle adjustably positioned upon the mirror frame and fluidly connected to the pump, a control unit electrically in communication with the pump and motor for allowing the user to manually control the operation while within the vehicle. The wiper blade includes a slip clutch which allows blade to be vertically aligned on each side of the mirror glass by engaging the opposing stopper members. The control unit preferably includes a pair of power switches and a pair of fluid switches for independently controlling the left and right sides of the mirrors. The dispensing nozzle is adjustably retained to the mirror frame by a clip member that allows repositioning of the dispensing nozzle depending upon the weather conditions to ensure adequate dispensing of the washer fluid.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a mirror wiper with washer that will overcome the shortcomings of the prior art devices.

Another object is to provide a mirror wiper with washer that has few moving components for the wiper arm assembly.

An additional object is to provide a mirror wiper with washer that utilizes independent pumps for distributing washer fluid to the dispensing nozzle.

A further object is to provide a mirror wiper with washer that allows the user to operate either the left or right side wiper devices depending upon weather conditions.

Another object is to provide a mirror wiper with washer that effectively cleans the surface of a side mirror of debris such as water and dirt.

A further object is to provide a mirror wiper with washer that reduces obstruction of the viewing area for a driver.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
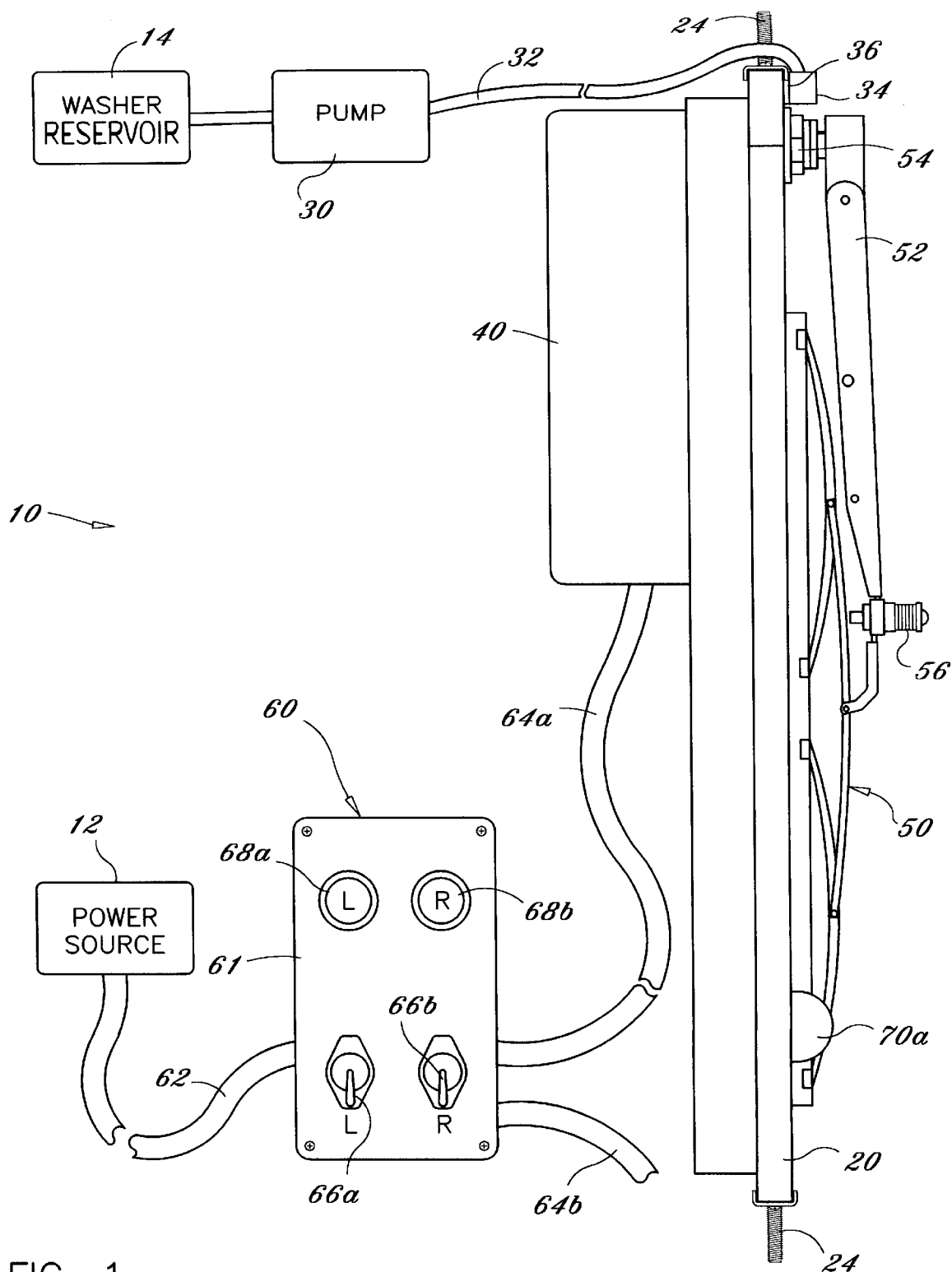
FIG. 1 is a side view of the present invention.

Turning now descriptively to the drawings, in which similar reference characters denote similar elements throughout the several view, FIGS. 1 through 4 illustrate a mirror wiper with washer 10, which comprises a motor 40 attached to the rear of a mirror frame 20 with the drive shaft extending through an aperture within the mirror glass 22, a wiper blade 50 attached to the end of the drive shaft, a pump 30 fluidly connected to a washer reservoir 14 on the vehicle, a dispensing nozzle 34 adjustably positioned upon the mirror frame 20 and fluidly connected to the pump 30, a control unit 60 electrically in communication with the pump 30 and motor 40 for allowing the user to manually control the operation while within the vehicle. The wiper blade 50 includes a slip clutch 56 that allows the blade to be vertically aligned on each side of the mirror glass 22 by engaging the opposing stopper members 70a–b. The control unit 60 preferably includes a pair of power switches 66a–b and a pair of fluid switches 68a–b for independently controlling the left and right sides of the mirrors. The dispensing nozzle 34 is adjustably retained to the mirror frame 20 by a clip member 36 that allows repositioning of the dispensing nozzle 34 depending upon the weather conditions to ensure adequate dispensing of the washer fluid.

Figure 2:
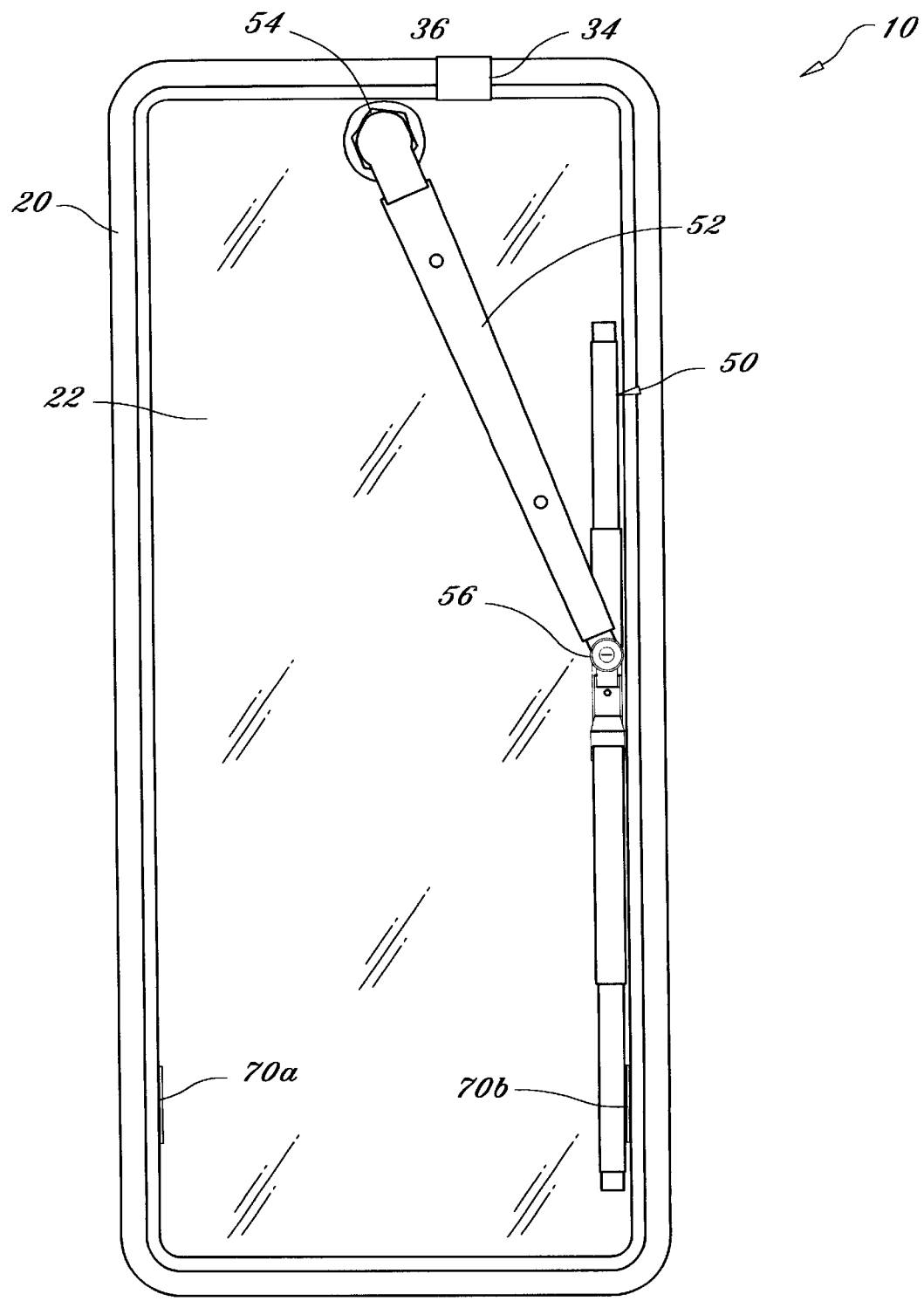
FIG. 2 is a front view of the present invention attached to the side mirror.
Figure 3:
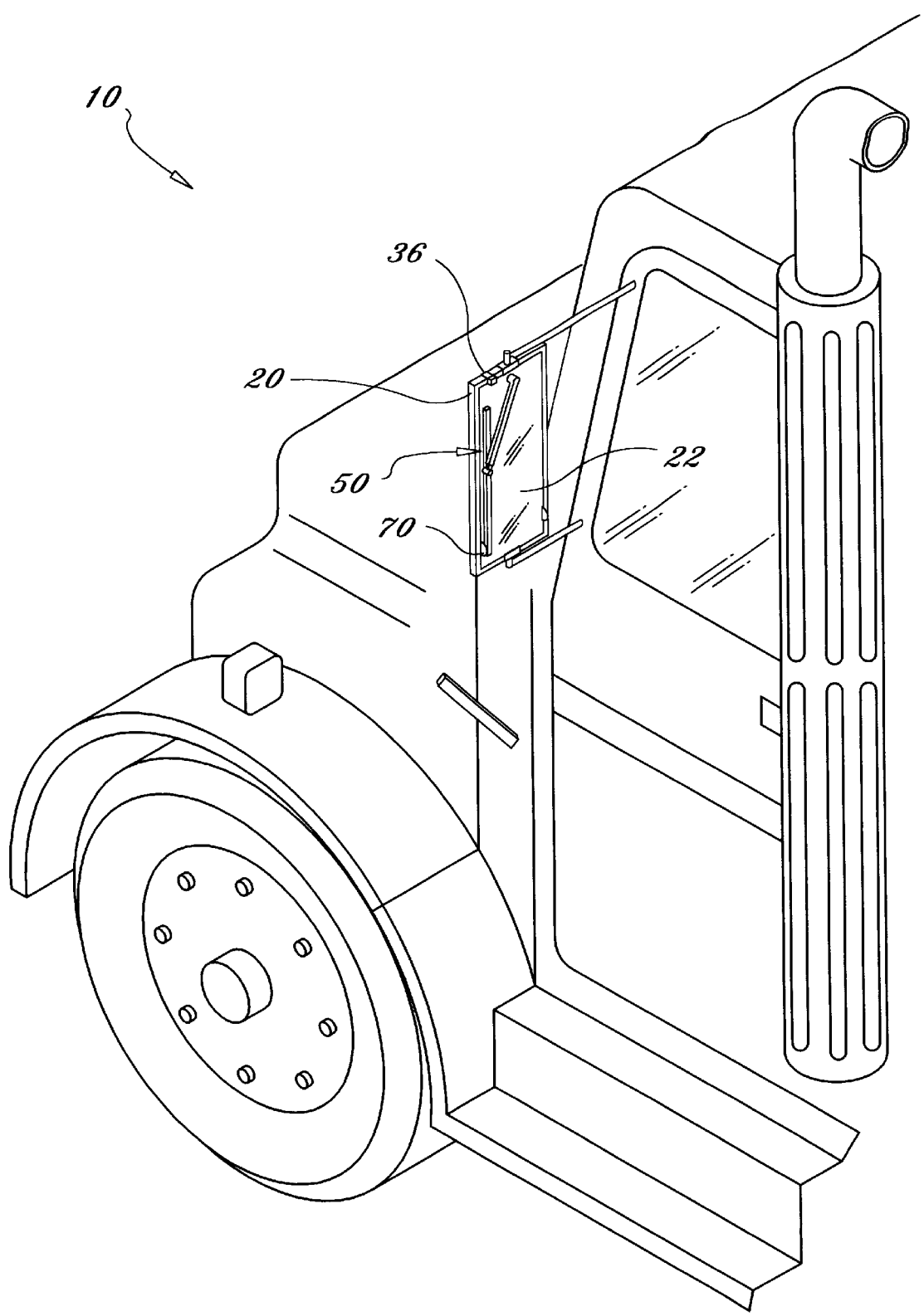
FIG. 3 is an upper perspective view of the present invention attached to a side mirror.

As shown in FIGS. 1 and 2 of the drawings, the mirror comprises a mirror frame 20 and a piece of mirror glass 22 within the mirror frame 20. A pair of opposing brackets 24 attached to the lower and upper portions of the mirror frame 20 allow attachment to a vehicle such as a truck or bus. There is a left side mirror and a right side mirror that attaches to the respective sides of a vehicle, replacing the existing side mirrors. Further discussion of the invention will mainly discuss only one of the side mirrors to simplicity and to avoid doubling of information. As can be appreciated by one skilled in the art, the mirror may be constructed of any well-known assembly and design.

As best shown in FIG. 1 of the drawings, the motor 40 is physically attached to the back surface of the mirror frame 20. The motor 40 is preferably a conventional self-aligning motor 40 for allowing the wiper blade 50 to always terminate movement in the same side location as shown in FIG. 2 thereby preventing obstruction of view when the invention is not in operation. A direct connection to the vehicle's power source 12 is made to the motor 40 for allowing the motor 40 to continue operation until the wiper blade 50 is in the desired location as utilized upon a conventional wiper motor 40.

The drive shaft from the motor 40 extends through the mirror frame 20 then through the mirror glass 22. A securing nut 54 is attached to an exteriorly threaded tube that extends from the motor 40 through the mirror frame 20 and mirror glass 22.

As best shown in FIGS. 1 and 2 of the drawings, the wiper blade 50 is directly attached to the distal end of the drive shaft of the motor 40. The armature 52 extends substantially orthogonally from the drive shaft and downwardly. The rubber blade is pivotally attached to the distal end of the armature 52 by a slip clutch 56. The slip clutch 56 comprises a threaded fastener extending through the armature 52 and the frame of the blade with a spring attached between for allowing slippage of the blade.

As shown in FIG. 2 of the drawings, a pair of stopper members 70a–b are attached to the sides of the mirror frame 20 adjacent the mirror glass 22. The stopper members 70a–b are preferably attached to the lower portion of the mirror frame 20. The stopper members 70a–b prevent the lower portion of the blade from exiting the mirror glass 22 and also force the upper portion of the blade to become vertically aligned on each side without having complex mechanical components to maintain alignment.

As shown in FIG. 1 of the drawings, a pump 30 is fluidly connected within a fluid line 32 to a washer reservoir 14 of a vehicle. There is preferably a pump 30 for the left side and the right side of the vehicle. It can be appreciated that a single pump 30 may be utilized for the present invention, however both mirrors may simultaneously receive washer fluid during operation. It can also be appreciated by one skilled in the art that the existing washer pump 30 of the vehicle may be utilized to provide washer fluid to the nozzles 34.

As shown in FIG. 1 of the drawings, a dispensing nozzle 34 is connected to a clip member 36. The clip member 36 is adjustably positioned about the mirror frame 20 for allowing adjustment of the dispensing nozzle 34 depending upon the weather conditions and speeds traveled by the driver. If the driver desires to have the washer fluid directed at a specific location upon the mirror glass 22 they can reposition the dispensing nozzle 34 adjacent the desired location.

As shown in FIG. 1 of the drawings, the control unit 60 has a housing 61 having any well-known shape and structure. A power cord 62 extends from the housing 61 to be electrically connected to the power source 12 of a vehicle such as a battery.

Figure 4:
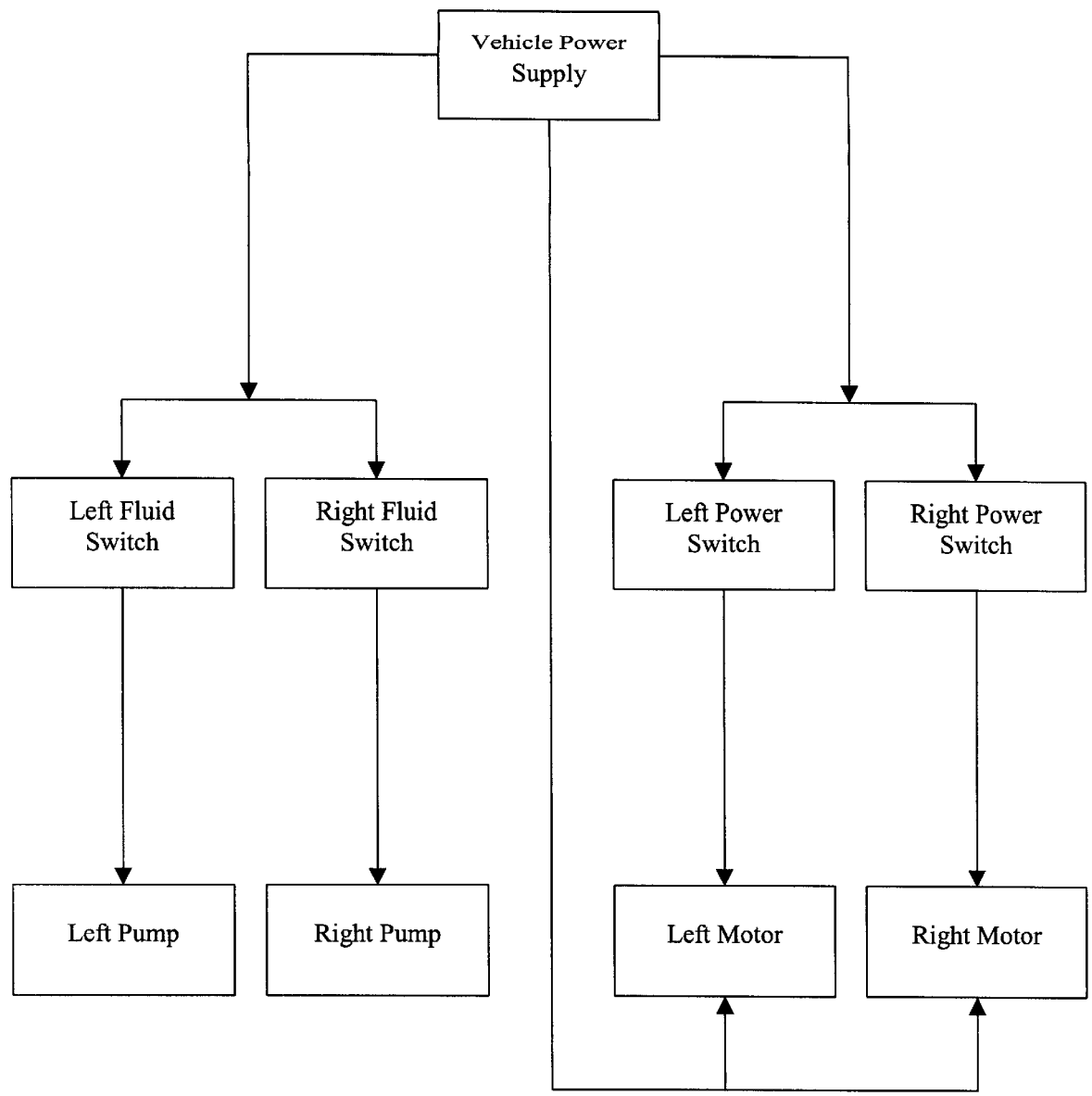
FIG. 4 is a block diagram of the electronic circuitry for the present invention.

As shown in FIG. 1 of the drawings, the control unit 60 includes a pair of power switches 66a–b which control the left motor 40 and right motor 40 of the invention. The power switches 66a–b are electrically connected between the power cord 62 and the motors 40 via the control cords 64a–b as shown in FIG. 4 of the drawings. As further shown in FIG. 4 of the drawings, the left motor 40 and right motor 40 are electrically connected to the power cord 62 directly for providing electrical power after the power switches 66a–b have been opened thereby allowing the motor 40 to reposition itself so that the wiper blade 50 is not obstructing the user's viewing area. The power switches 66a–b allow the individual to control the left wiper blade 50 and the right wiper blade 50. It can be appreciated by one skilled in the art that a single power switch 66 can be utilized to control both motors 40.

As shown in FIG. 1 of the drawings, the control unit 60 also includes a pair of fluid switches 68a–b that are electrically connected between the power cord 62 and the pumps 30 via the control cords 64a–b as shown in FIG. 4 of the drawings. The fluid switches 68a–b allow the individual to control the operation of the pumps 30. It can be appreciated by one skilled in the art that a single fluid switch 68 can be utilized to control both motors 40.

In use, the user positions the dispensing nozzle 34 upon the mirror frame 20 as desired to achieve the desire dispensing of the washer fluid. While driving the vehicle, the mirror glass 22 may become contaminated by debris such as dirt or water. The user then has the option of closing either or both of the power switches 66a–b to enable the motor 40. The motor 40 rotates the wiper blade 50 from side to side. As shown in FIG. 2 of the drawings, the blade of the wiper blade 50 is substantially parallel to the side of the mirror frame 20 and adjacent the stopper member 70b. As the wiper blade 50 is rotated to the left side of the mirror frame 20 the lower portion of the blade approaches the left side of the mirror frame 20 before the upper portion of the blade. The lower portion of the blade thereby engages the left stopper member 70a while the armature 52 is still being rotated by the motor 40 thereby rotating the blade upon the slip clutch 56 until the blade is substantially parallel to the left side of the mirror frame 20. The same process continues as the wiper blade 50 approaches the right side of the mirror frame 20. The user also has the option of closing either or both of the fluid switches 68a–b thereby operating the pumps 30 for dispensing wiper fluid upon the mirror glass 22 during operation of the wiper blade 50. This process continues until the mirror glass 22 no longer requires cleaning, then the user opens the power switches 66a–b and the fluid switches 68a–b. The motor 40 then aligns the wiper blade 50 to the side of the mirror glass 22 to prevent obstruction of the viewing by the driver.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A mirror wiper with washer, comprising:
a mirror having a frame and a viewing surface;
a motor attached to said frame, wherein a drive shaft of said motor extends through said frame and said viewing surface;
a wiper blade attached to said drive shaft for engaging and cleaning said viewing surface;
a control unit electrically connected to said motor for allowing a driver to control said motor while driving;
a fluid dispensing means attachable to said mirror for dispensing cleaning fluid upon said viewing surface;
wherein said fluid dispensing means comprises:
a dispensing nozzle;
a clip member attached to said dispensing nozzle for adjustably attaching to said mirror; and
a pump fluidly connected between said dispensing nozzle and a washer reservoir through a fluid line, wherein said pump is electrically connected to said control unit;
wherein said wiper blade comprises:
an armature attached to said drive shaft of said motor;
a blade member; and
a slip clutch mechanically pivotally connecting said blade member to said armature for allowing said blade member to frictionally pivot upon said armature;
a pair of stopper members attached to opposing sides of said frame of said mirror;
wherein said pair of stopper members are attached to a lower portion of said mirror for engaging a lower portion of said blade member;
wherein said control unit comprises:
a housing;
a power cord electrically connectable to a power source within a vehicle;
a power switch within said housing and electrically connected between said power cord and said motor; and
a fluid switch within said housing and electrically connected between said power cord and said pump;
wherein said motor repositions said wiper blade in a side position when said power switch is opened; and
wherein said slip clutch includes a compression spring for allowing adjustment of frictional pressure.
2. The mirror wiper with washer of claim 1, wherein said washer reservoir is an existing washer reservoir upon a vehicle.
3. A mirror wiper with washer, comprising:
a first mirror having a first frame and a first viewing surface;
a second mirror having a second frame and a second viewing surface;
a first motor attached to said first frame, wherein a first drive shaft of said first motor extends through said first frame and said first viewing surface;
a second motor attached to said second frame, wherein a second drive shaft of said second motor extends through said second frame and said second viewing surface;
a first wiper blade attached to said first drive shaft for engaging and cleaning said first viewing surface;
a second wiper blade attached to said second drive shaft for engaging and cleaning said second viewing surface;
a control unit electrically connected to said first motor and said second motor for allowing a driver to control said motors while driving;
a fluid dispensing means attachable to said first mirror and said second mirror for dispensing cleaning fluid upon said first viewing surface and said second viewing surface;

wherein said fluid dispensing means comprises:
  a first dispensing nozzle;
  a first clip member attached to said first dispensing nozzle for adjustably attaching to said first mirror;
  a first pump fluidly connected between said first dispensing nozzle and a washer reservoir through a first fluid line, wherein said first pump is electrically connected to said control unit;
  a second dispensing nozzle;
  a second clip member attached to said second dispensing nozzle for adjustably attaching to said second mirror; and
  a second pump fluidly connected between said second dispensing nozzle and a washer reservoir through a second fluid line, wherein said second pump is electrically connected to said control unit;
wherein said first wiper blade and said second wiper blade each comprise:
  an armature attached to said drive shaft of said motor;
  a blade member; and
  a slip clutch mechanically pivotally connecting said blade member to said armature for allowing said blade member to frictionally pivot upon said armature;
a pair of stopper members attached to opposing sides of each said frame of said first mirror and said second mirror;
wherein said pair of stopper members are attached to a lower portion of said mirror for engaging a lower portion of said blade member;
wherein said control unit comprises:
  a housing;
  a power cord electrically connectable to a power source within a vehicle;
  a pair of power switches within said housing and electrically connected between said power cord and said first motor and said second motor; and
  a pair of fluid switches within said housing and electrically connected between said power cord and said first pump and said second pump;
wherein said motor repositions said wiper blade in a side position when said power switch is opened;
wherein said slip clutch includes a compression spring for allowing adjustment of frictional pressure.

4. The mirror wiper with washer of claim 3, wherein said washer reservoir is an existing washer reservoir upon a vehicle.

5. A mirror wiper with washer, comprising:
a mirror having a frame and a viewing surface;
a motor attached to said frame, wherein a drive shaft of said motor extends through said frame and said viewing surface;
a wiper blade attached to said drive shaft for engaging and cleaning said viewing surface; and
a control unit electrically connected to said motor for allowing a driver to control said motor while driving;
wherein said wiper blade comprises:
  an armature attached to said drive shaft of said motor;
  a blade member; and
  a slip clutch mechanically pivotally connecting said blade member to said armature for allowing said blade member to frictionally pivot upon said armature, wherein said slip clutch includes a compression spring for allowing adjustment of frictional pressure.

6. The mirror wiper with washer of claim 5, including a fluid dispensing means attachable to said mirror for dispensing cleaning fluid upon said viewing surface.

7. The mirror wiper with washer of claim 6, wherein said fluid dispensing means comprises:
a dispensing nozzle;
a clip member attached to said dispensing nozzle for adjustably attaching to said mirror; and
a pump fluidly connected between said dispensing nozzle and a washer reservoir through a fluid line, wherein said pump is electrically connected to said control unit.

8. The mirror wiper with washer of claim 7, wherein said washer reservoir is an existing washer reservoir upon a vehicle.

9. The mirror wiper with washer of claim 5, including a pair of stopper members attached to opposing sides of said frame of said mirror.

10. The mirror wiper with washer of claim 9, wherein said pair of stopper members are attached to a lower portion of said mirror for engaging a lower portion of said blade member.

11. The mirror wiper with washer of claim 5, wherein said control unit comprises:
a housing;
a power cord electrically connectable to a power source within a vehicle;
a power switch within said housing and electrically connected between said power cord and said motor, and
a fluid switch within said housing and electrically connected between said power cord and said pump.

12. The mirror wiper with washer of claim 5, wherein said motor repositions said wiper blade in a side position when said power switch is opened.

* * * * *